Oct. 11, 1938.   T. P. FOWLER   2,132,407
PITCHOMETER
Filed May 6, 1937   10 Sheets-Sheet 4
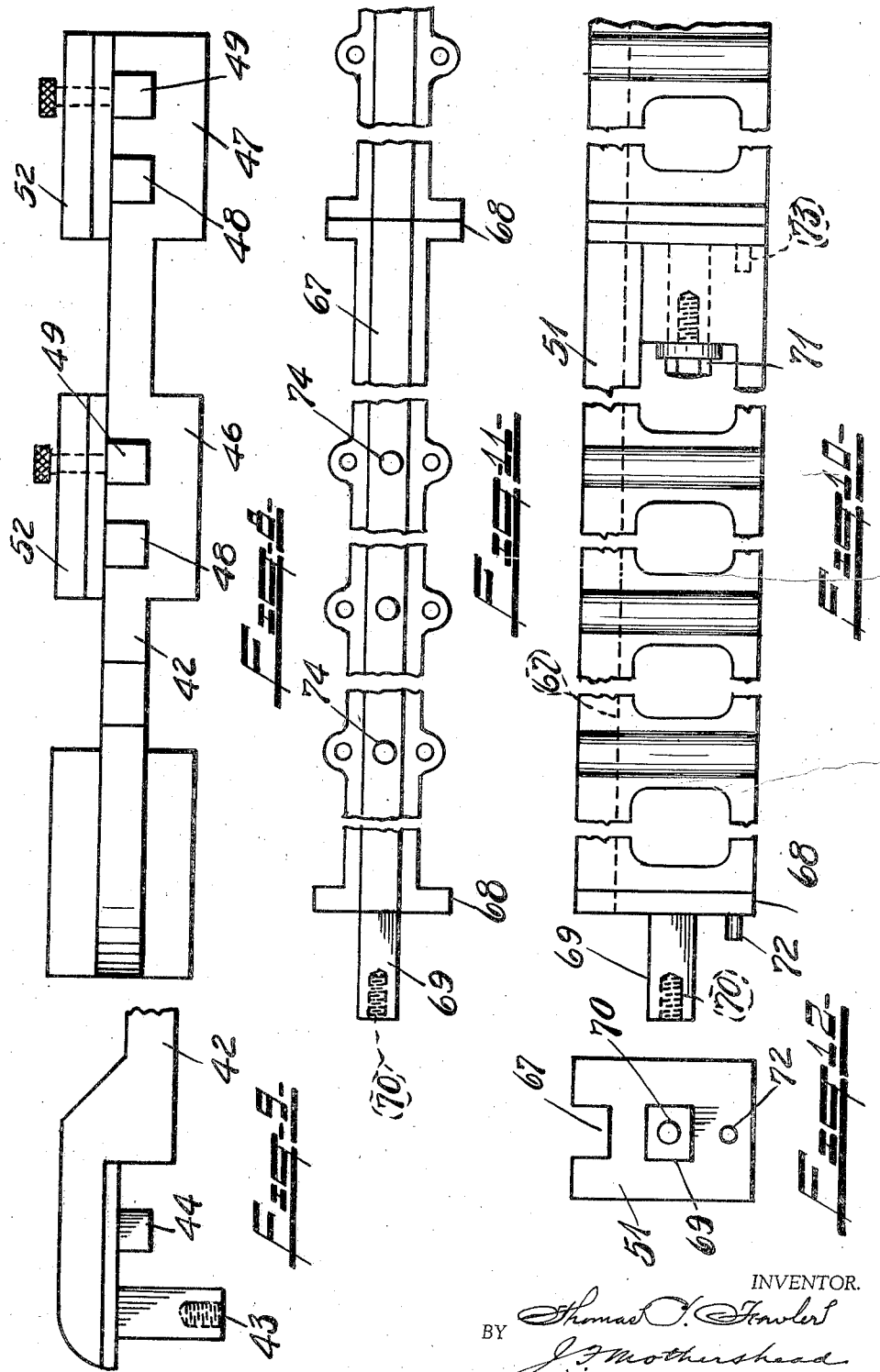
INVENTOR.
Thomas P. Fowler
BY
J. F. Mothershead
ATTORNEY.

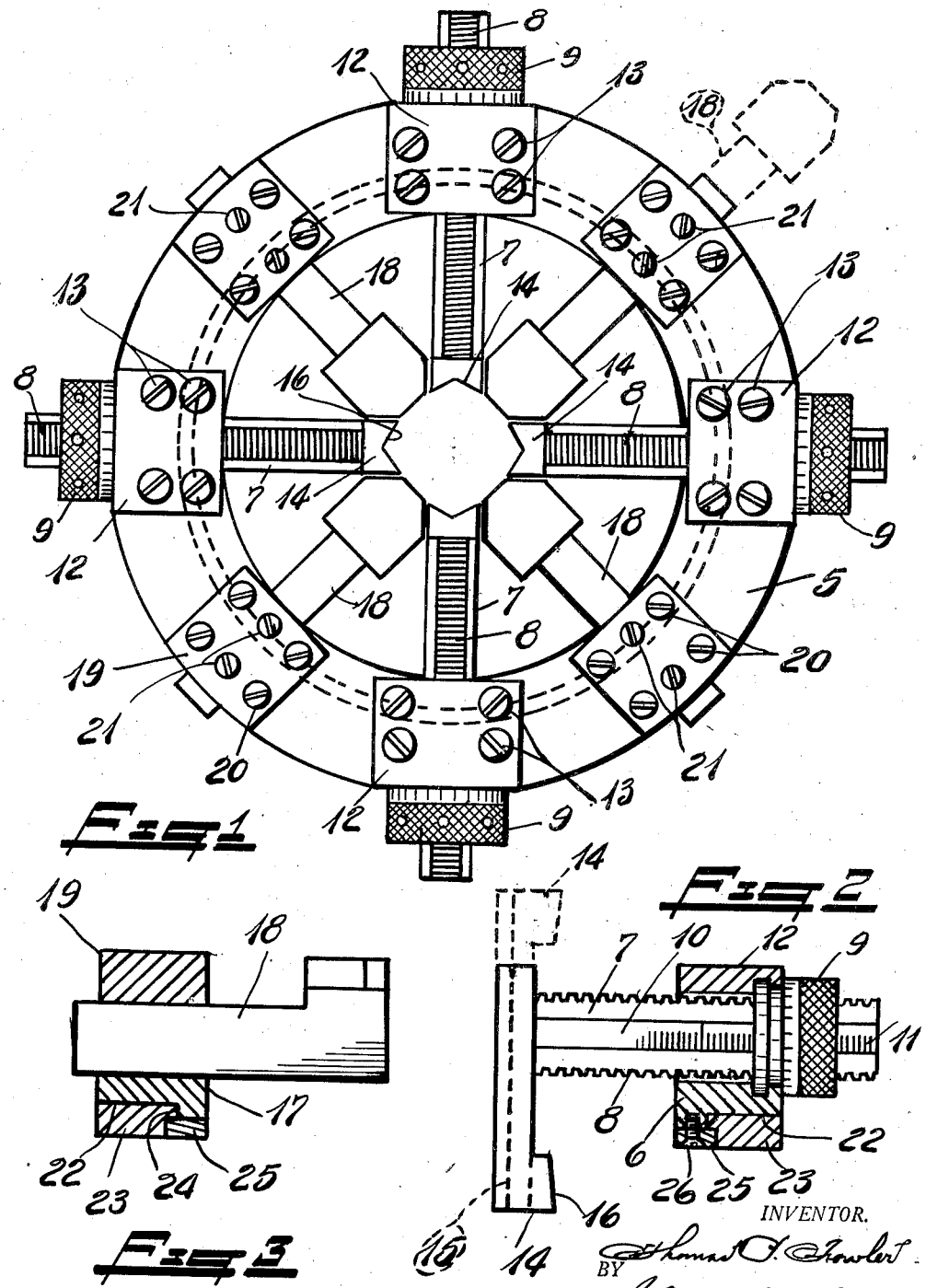

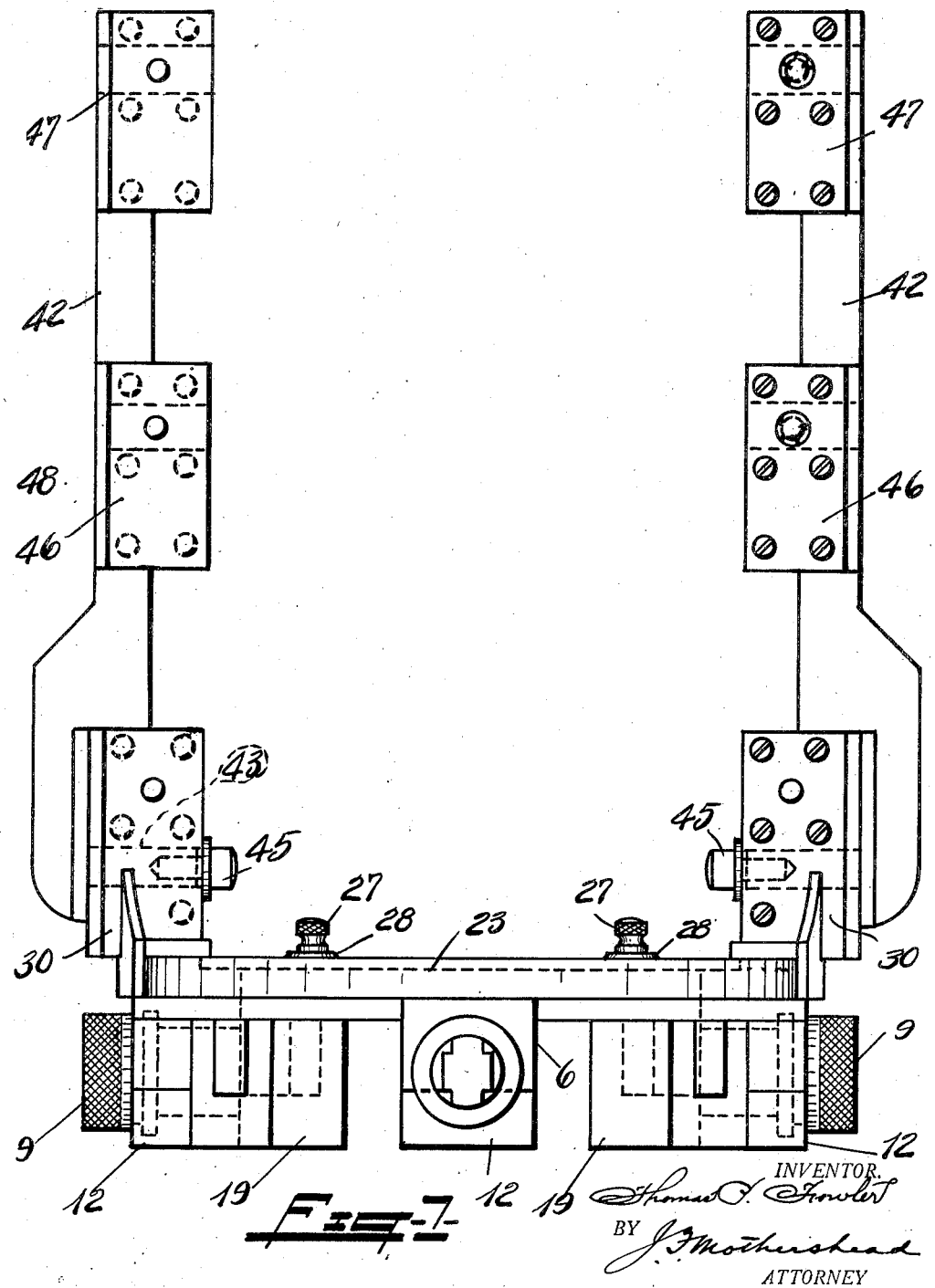

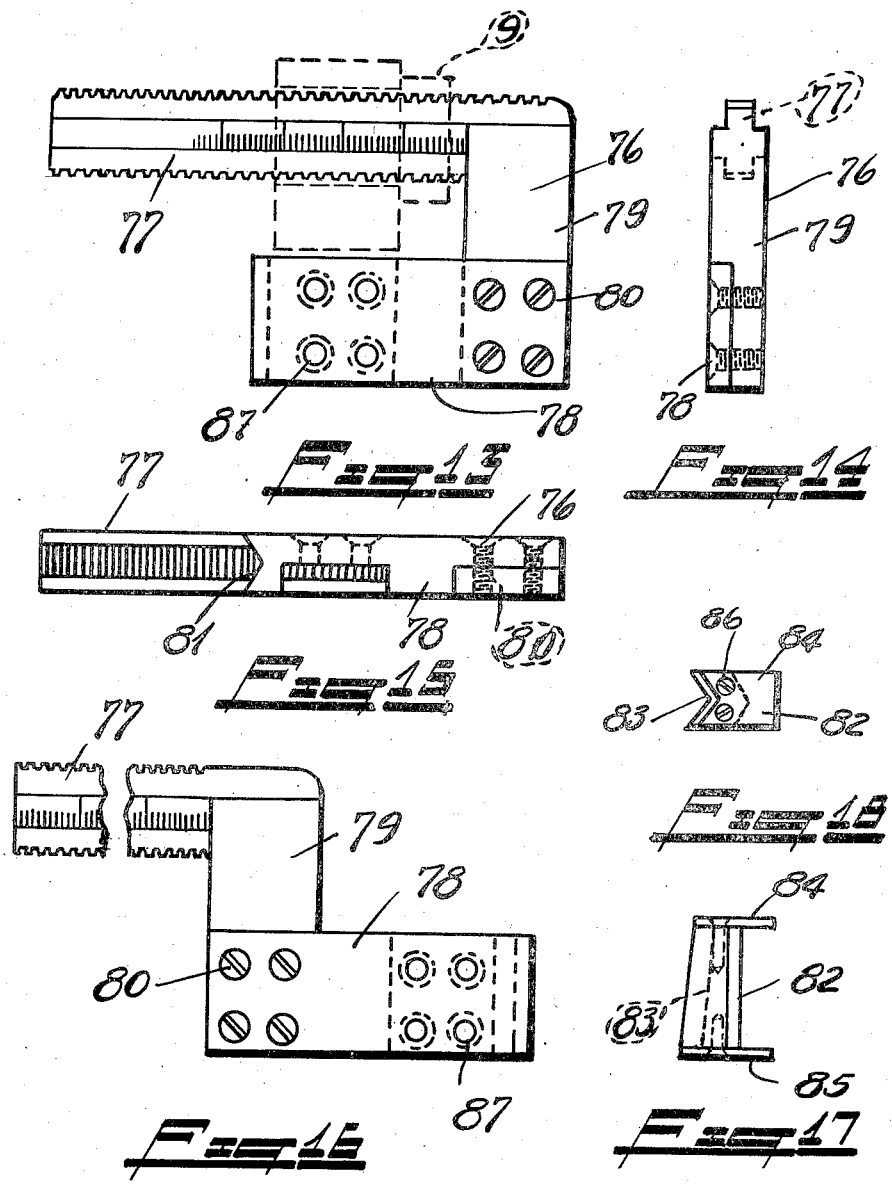

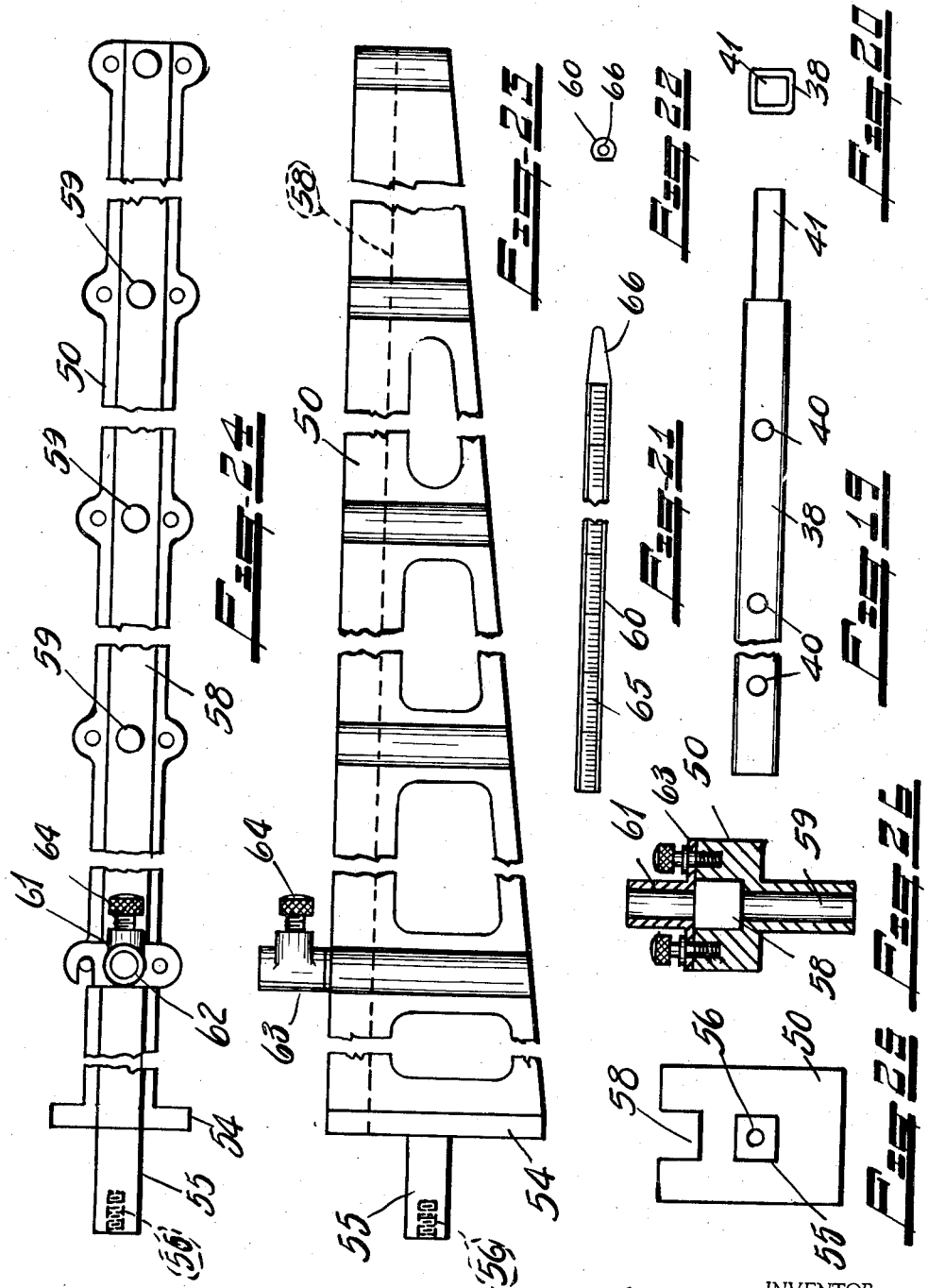

Oct. 11, 1938.　　　T. P. FOWLER　　　2,132,407
PITCHOMETER
Filed May 6, 1937　　　10 Sheets-Sheet 7
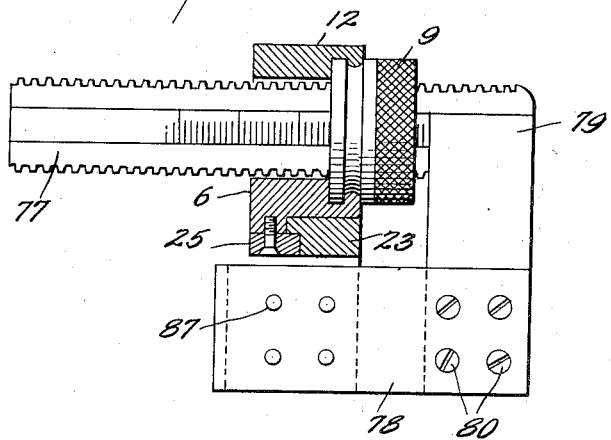
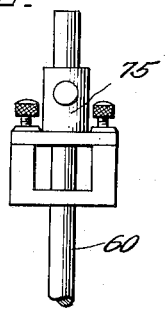

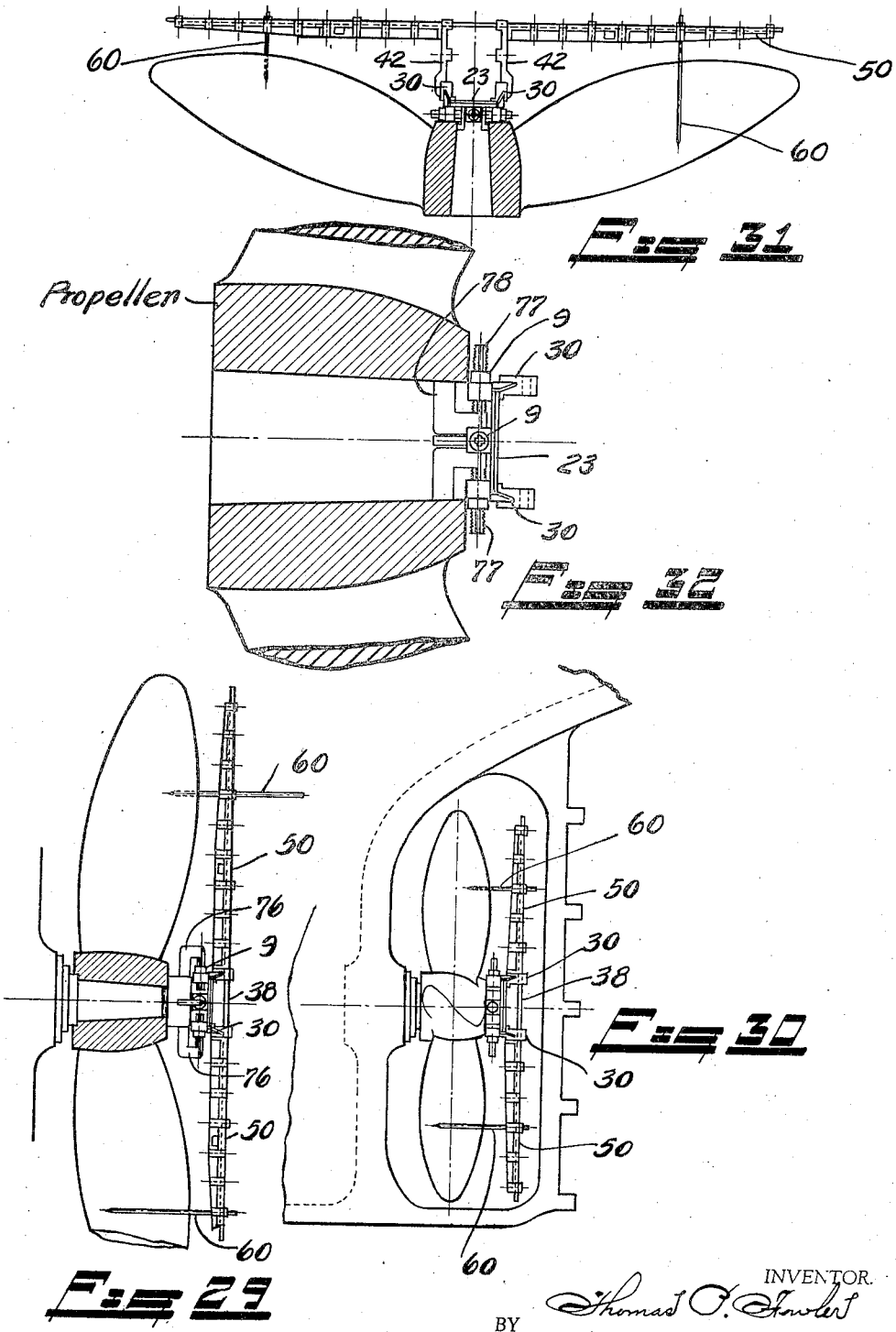

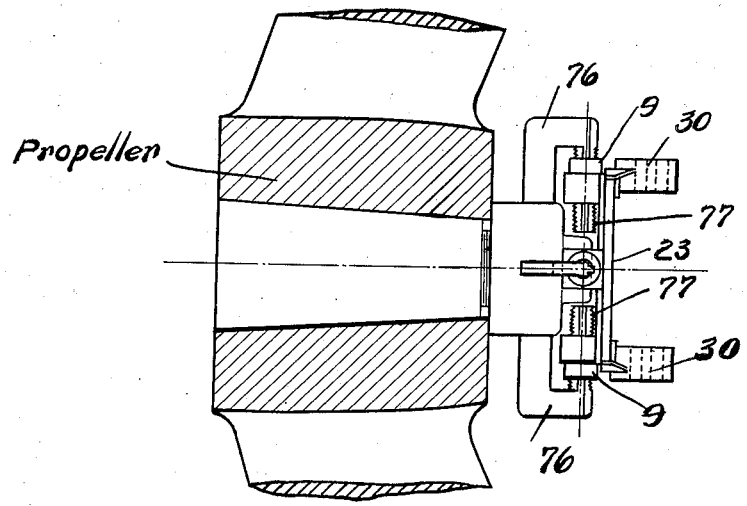
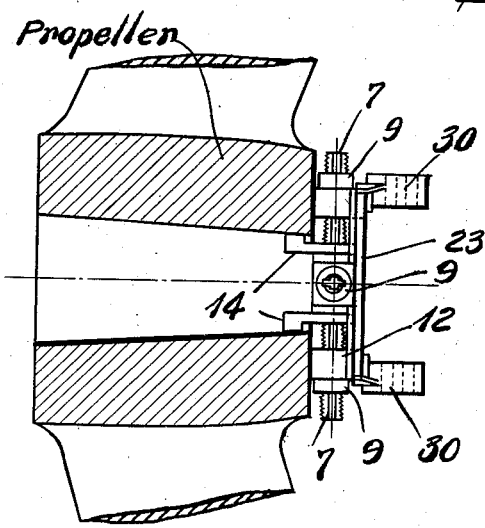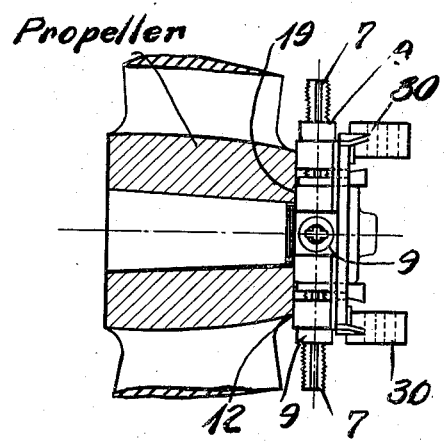

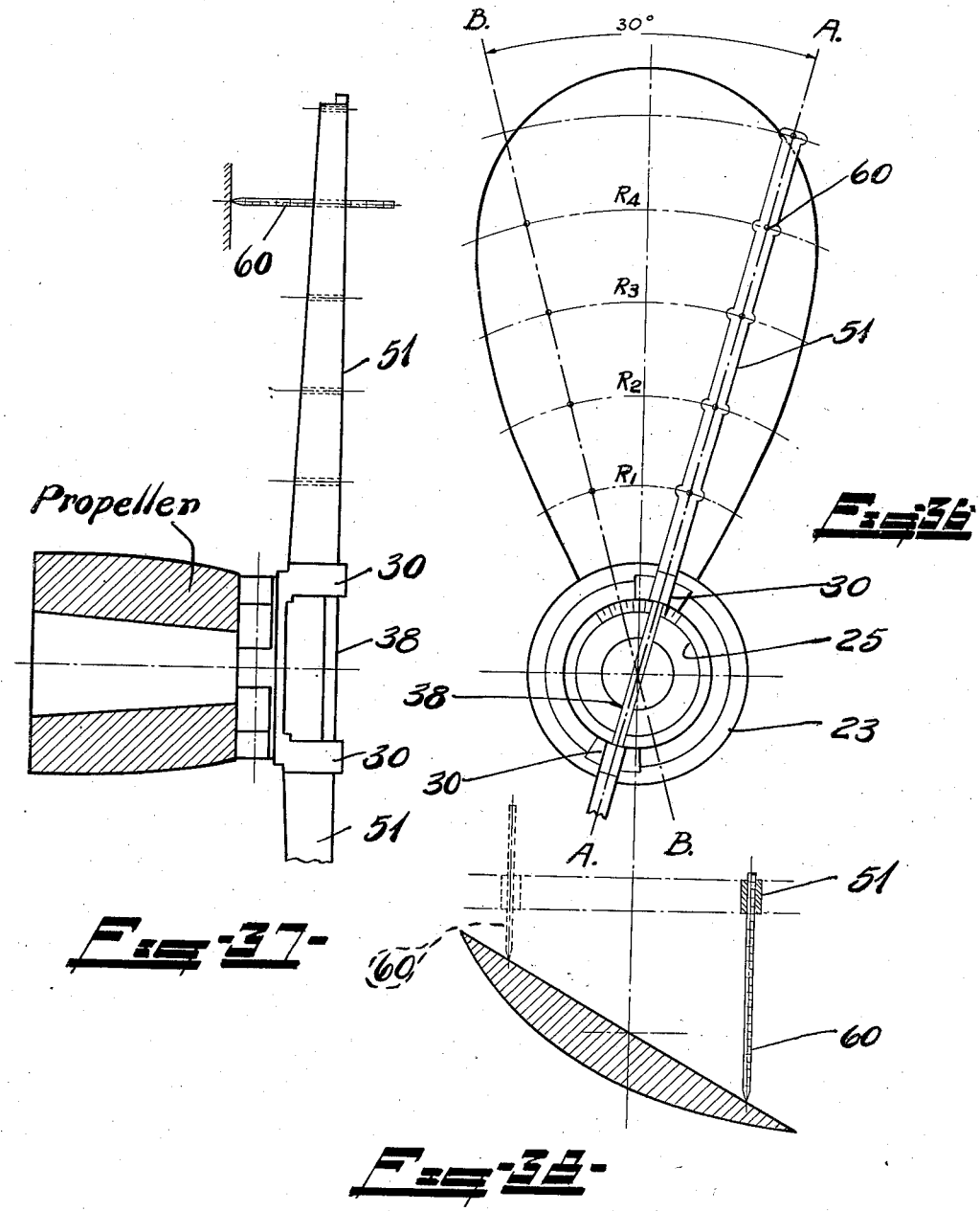

Patented Oct. 11, 1938

2,132,407

UNITED STATES PATENT OFFICE 2,132,407

PITCHOMETER

Thomas P. Fowler, Pittsburgh, Pa.

Application May 6, 1937, Serial No. 141,100

6 Claims. (Cl. 33—174)

(Granted under the act of March 3, 1883, as amended April 30, 1928; 370 O. G. 757)

The invention described herein may be manufactured and used by or for the Government of the United States for governmental purposes only, without the payment of any royalty thereon.

This invention relates to pitchometers for measuring pitch and rake of propeller blades and similar generated surfaces.

One of the prime objects of the invention is to design a pitchometer of simple and substantial construction, which can be used to measure the pitch and rake of propeller blades without the necessity of removing them from their propeller shaft or placing them in leveled position on the ground.

Another object is to provide a self-contained pitchometer which is easily transported, which can be quickly set up for use, and which is capable of measuring pitch and rake on the face and back of all types and sizes of ship and similar type propeller blades.

A further object is to provide a pitchometer which can be used to determine and check the pitch of foundry moulds used for casting all types of solid and/or built-up propeller blades, thus insuring more accurate and better castings.

A still further object is to design a pitchometer provided with extension arms and reversible connections to permit propellers of various sizes to be measured.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit, or sacrificing any of the advantages of the invention.

In the drawings—

Fig. 1 is a top plan view of the hub face of the machine with the chucking screws, extension palms and bearing caps in position thereon, the broken lines showing one of the extension palms reversed.

Fig. 2 is a part sectional side elevational view of one of the reversible chucking screws and adjusting nut, the broken lines showing the chucking nut in reversed position and as used when the pitchometer is mounted on the nut on the end of the propeller shaft.

Fig. 3 is a part sectional detail showing one of the extension palms, the hub face ring and bearing.

Fig. 7 is a side elevational view of the pitchometer showing the extension members in position for supporting the radius rods when measuring raked propellers, the chucking screws and extension palms being omitted for the sake of clearness.

Fig. 8 is an elevation of one of the extension members.

Fig. 9 is a fragmentary side elevational view of one of the extension members illustrating the spuds for securing the extension member in the radius rod holders.

Fig. 10 is a side elevational view of the extension arm used to increase the operating radius of the pitchometer for measuring propellers over six (6') feet in diameter.

Fig. 11 is a top plan view thereof, and

Fig. 12 is an end view.

Fig. 13 is a side elevational view of one of the gooseneck type chucking screws used for attaching the pitchometer concentrically with the propeller axis on a propeller nut over seven inches in diameter, as when measuring the pitch of a propeller installed on its shaft, the broken lines showing the bearing and adjusting nut.

Fig. 14 is an end view of the gooseneck type chucking screw, and

Fig. 15 is an inverted plan view thereof.

Fig. 16 is a view similar to Fig. 13 with the blade in reversed position.

Fig. 17 is a side elevational view of the adapter used to compensate for the taper in the hub bores and is used when the blade is in position as shown in Fig. 13.

Fig. 18 is a top plan view.

Fig. 19 is a plan showing one section of the jointed radius rod.

Fig. 20 is an end view thereof.

Fig. 21 is a plan view of the graduated pitch rod for measuring pitch elevations.

Fig. 22 is an end view thereof.

Fig. 23 is a side elevational view of the radius rod bracket used for supporting the radius rod shown in Fig. 19 and is used when measuring propellers of from four feet (4) and beyond in diameter, one of the top side clamps used for holding the pitch rod being shown mounted in position thereon.

Fig. 24 is a top plan view also showing top side clamps in position.

Fig. 25 is an end view of the radius rod bracket.

Fig. 26 is a vertical sectional view of one of the top side clamps as used when radius rods extend beyond the brackets.

Fig. 27 is a fragmentary view similar to Fig. 2 showing the gooseneck type chucking screws in position.

Fig. 28 is a vertical sectional view of the sliding clamp used on radius rod for holding pitch rod.

Fig. 29 is a general arrangement in elevation showing the pitchometer set up for measuring a propeller on its shaft in ship, in which the pitchometer is shown attached to the outside of the propeller nut by the gooseneck chucking screws shown in Fig. 13 and arranged as shown in Fig. 33.

Fig. 30 is a general arrangement in elevation showing the pitchometer set up for measuring a propeller on its shaft in ship, and showing the pitchometer attached to the nut by the chucking screws shown in Fig. 2 and arranged as shown in Fig. 35.

Fig. 31 is a general arrangement in elevation showing the pitchometer set up for measuring a heavy raked propeller which is laying on the ground, and showing the pitchometer attached to the propeller by chucking screws shown in Fig. 2 and arranged as shown in Fig. 34.

Fig. 32 is a part sectional elevation showing method of attaching pitchometer to propeller having a hub bore over nine inches in diameter, and showing the gooseneck chucking screws with reverse chuck blades shown in Fig. 16 and fitted with the taper adapters shown in Fig. 17 for centering the pitchometer on the hub bore.

Fig. 33 is a part sectional elevation showing method of attaching pitchometer to propeller nuts over seven inches in diameter across corners of nut, and showing the gooseneck chucking screws shown in Fig. 13.

Fig. 34 is a part sectional elevation showing method of attaching pitchometer to propeller hub bore, and showing the chucking screws shown in Fig. 2.

Fig. 35 is a part sectional elevation showing method of attaching pitchometer on propeller nuts six (6") or less.

Fig. 36 is a plan view illustrating the application of the device to a propeller blade for taking pitch measurements.

Fig. 37 is a fragmentary elevation of Fig. 36.

Fig. 38 is a sectional elevation of Fig. 36.

Figure 4:
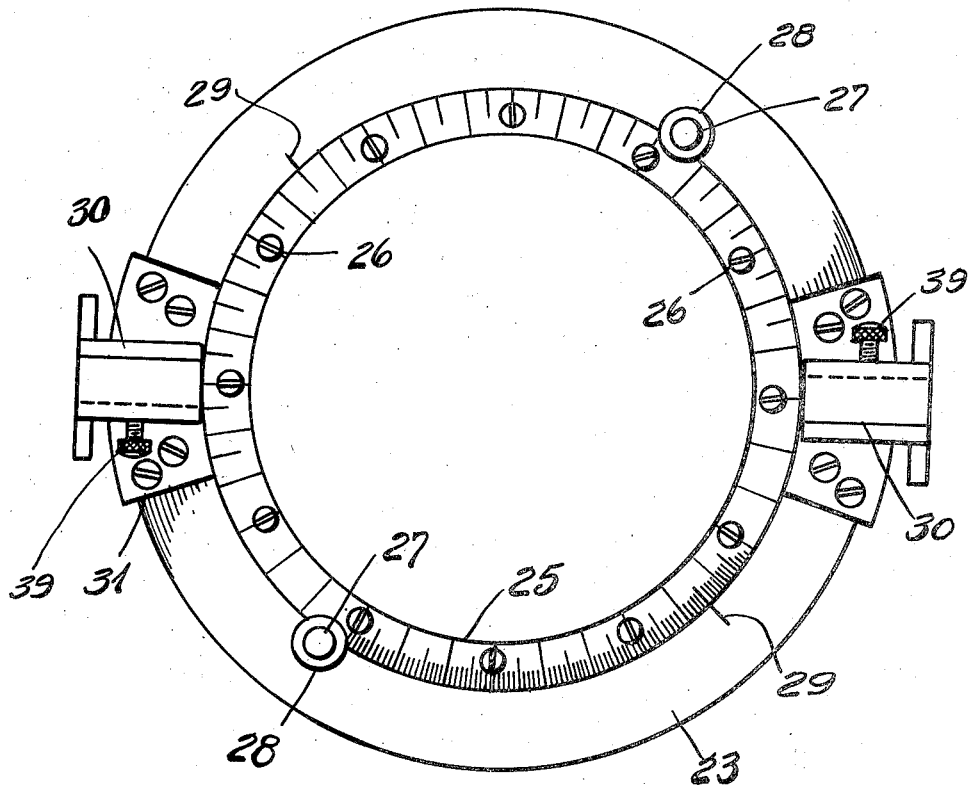
Fig. 4 is a plan view of the working face of the pitchometer showing the graduated retainer ring, the rotating ring and radius rod holders mounted in position thereon.

In order to insure a pitchometer which will be light in weight, have the necessary strength and resist corrosion, I prefer to make all parts of high tensile, aluminum alloy, although any other suitable material may be used if desired, and in order to eliminate parts and simplify the general construction, duplicate parts are made interchangeable and are reversible for use in two or more working positions.

Referring to the drawings by reference numerals, 5 indicates a hub ring having the diametrically spaced, chucking screw bearings 6 cast integral therewith, and in which the chucking screws 7 are mounted, said chucking screws being threaded on their top and bottom edges only as shown at 8, and engage the adjusting nuts 9 which are used to manipulate said chucking screws to center the pitchometer and secure it to the propeller being measured. The center section 10 of these chucking screws serve as a guide rib and is graduated at 11, so that they may be accurately adjusted. A cap 12 forms the upper part of each bearing and is secured in position by screws 13 as usual. These chucking screws are formed with a hook shaped end 14, and are of identical construction, being also reversible to permit using the hook ends up or down as clearly shown in Fig. 2 of the drawings and can be mounted with the hook ends within or without the opening in the hub ring 5.

The hook end or foot 14 is grooved as shown at 15 to prevent slipping when bearing on the corner of a propeller nut and also to assist in centering on outside of the shaft. It will also be noted that the shouldered end 16 is V-shaped in cross section to compensate for the taper relative to the axis of the propeller for proper bearing when centering on the walls of the hub bore.

The adjusting nut 9 can be hand manipulated or can be turned by means of a suitable wrench (not shown) if desired. A micrometer scale in twenty parts is provided on the circumference of the nut adjacent the bearing cap 12 on which a vertical center mark is provided, and by manipulation of these nuts the pitchometer can be accurately centered on the propeller axis. Turning adjusting nut one space on micrometer scale moves chucking screw in or out as desired.

Circumferentially spaced, extension arm bearings 17 are also formed integral with the hub ring and accommodate the hub face extension palms 18, bearing caps 19 being provided as usual and are held in position by means of screws 20. These palms are of identical construction and are reversible so that they can be arranged inside of the hub ring as shown in Fig. 1, when the pitchometer is mounted on the hub bore of a propeller having a hub face of less than nine (9) inches, or outside as indicated in broken lines in Fig. 1 when centering the pitchometer on a hub bore exceeding eleven (11) inches in diameter. These palms are fixed or secured in set position by means of set screws 21.

The bearing caps 12 and 19 respectively are first fitted and the upper surfaces are then accurately machined so that they are at right angles to the axis of the pitchometer, these planed surfaces being placed in contact with the face of the propeller hub or paralleled thereto when centering the pitchometer on the hub bore or propeller nut.

The face of the hub ring is grooved at at 22 and a rotating ring 23 is mounted to rotate thereon, one edge of said rotating ring being turned as at 24, and a retaining ring 25 fits over said turned section and is secured to this ring by means of screws 26 or the like. The outer face of this retaining ring carries the radial degree graduations as shown, and the rotating ring can be turned through 360 degrees to obtain pitch measurements at any angle on a propeller blade, said rotating ring being secured in set position by means of clamp screws 27 and bearing washers 28. Index marks 29 are provided on the rotating ring for reading angular displacements.

Figure 5:
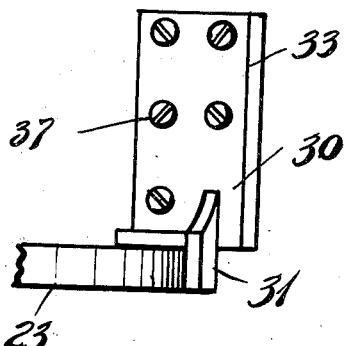
Fig. 5 is an end elevational view of one of the radius rod holders.
Figure 6:
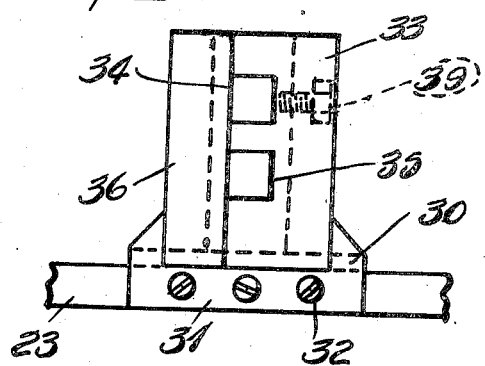
Fig. 6 is an edge view thereof.

Radius rod holders 30 are mounted on the rotating ring 23, and are formed with a flange 31 which fits over the edge of said ring, said holders being secured in position by means of screws 32. These holders are formed, as clearly shown in Figs. 5 and 6 of the drawings, the vertically disposed sections 33 being provided with openings 34 and 35 respectively, and a cover plate 36 forms a closure for one side thereof and is secured in position by means of screws 37 as usual.

These radius rod holders provide a support for the radius rods 38 shown in Figs. 19 and 20 respectively of the drawings, said rods being mounted in the openings 34 and are held in position by set screw 39. Said rods are preferably formed of square tubing provided with openings 40 in spaced-apart relation, a square bar 41 being secured in the end of each tube and is insertable into the end of the adjacent radius rod to form an extension to provide a rod of necessary length to measure propellers of large diameter, as will be hereinafter more fully described.

Extension radius rod holders 42 are mounted on the rotating ring and are used to elevate the radius rods above the propeller hub face twelve (12) or eighteen (18) inches or more to permit measuring pitch of heavy raked propellers. These extension rod holders are formed as clearly shown in Figs. 7, 8 and 9 of the drawings, spuds 43 and 44 being formed on the lower end thereof and are accommodated in the openings 34 and 35 provided in the radius rod holders. Shoulder bolts 45 are provided and are threaded into the end of the spud 43 to secure the extension rod holder in position.

Radius rod holder assemblies 46 and 47 respectively are provided on each extension rod holder, and are provided with openings 48 and 49 of the same size and relationship as the radius rod holders 30. These holders are adapted to accommodate either the brackets 50 or the extension pieces 51 as required, the upper part of the holders being offset inwardly to keep them in alignment with the outer faces of the radius rod holders 30, so that the pitch readings can be taken at the same radius from the propeller axis when using the brackets 50 or extension pieces 51, regardless of whether they are mounted in the holders 30, 46 or 47. Cover plates 52 are, of course, provided for these socket assemblies and are secured in position by means of screws 53.

The bracket 50 is formed as clearly shown in Figs. 23, 24 and 25, being preferably tapered and is used when measuring propellers of from four (4) to ten (10) feet in diameter, the inner end being formed with a flange 54, and a spud 55 is formed integral with and projects from the end thereof. Said spud is accommodated in one of the openings 48 in either of the holder assemblies, the end of each spud being drilled and threaded as at 56 to accommodate a shoulder screw 57 as usual, and to secure the bracket in position.

A grooved channel 58 is provided in the upper face of the bracket 50 and accommodates the radius rod 38, the sections of which can be readily secured end to end as necessary.

Vertically disposed pitch rod openings 59 are provided in the bracket 50 in spaced-apart relation and are adapted to accommodate the pitch rod 60. A top side clamp 61 being mounted in the opening is provided with a tubular section 62 in alignment with the opening, set screws 63 serving to secure the top clamp on the bracket. The pitch rod 60 extends through said tubular section and opening 59, and a set screw 64 secures the pitch rod in set position, said rod being graduated as at 65 and the end 66 is preferably detachable to permit replacement when worn or for any other reason.

The extension members 51 are shown in Figs. 10, 11 and 12 of the drawings, and are used when measuring propellers over ten (10) feet in diameter. They are formed somewhat similar to the brackets 50, the upper surface of each having a channel 67 to receive the radius rod 38, a flange 68 being provided on the ends of each section, and spud 69 is formed on one end as shown and is provided with a threaded opening 70 to receive a shoulder bolt 71 in the usual manner. A projecting pin 72 is provided on the end of said extension member and is received in the opening 73 provided in the radius rod holder or in the adjacent extension member. These members are designed to eliminate sag and vibration in themselves and the radius rod which they support.

Openings 74 are provided in this extension member 51 in spaced-apart relation and sliding clamps 75 are provided for use in connection with radius rod 38 for holding the pitch rod 60 when bracket 59 is not used or when radius rod is extended beyond the end of the bracket 50.

The gooseneck chucking screws 76 (see Figs. 13, 14 and 15) are used for attaching the pitchometer concentrically with propeller axis to a propeller nut over seven (7) inches in diameter, for example, when measuring the pitch of a propeller in position on its shaft. These gooseneck members are provided with threaded stems 77, threaded similarly to chucking screws 7, and blades 78 are secured to the shanks 79 by means of screws 80. The bearing end of each blade is V-grooved as at 81 and is adapted to receive the adapters 82, shown in Figs. 17 and 18 of the drawings, said adapters being also V-shaped in cross section as shown at 83. The V-groove is suitably tapered to compensate for the tapered bore in propeller bore, and upper and lower plates 84 and 85 respectively are secured to the adapter 82 and screws 86 to secure the adapter in position.

The blades 78 are reversible as indicated in Fig. 16, so that these gooseneck chucking screws can be utilized to clamp the pitchometer in position, openings 87 being provided in the blade so that it can be readily attached to clamp a propeller of large bore diameter.

To measure the pitch of a propeller after the pitchometer has been set up and properly centered with axis of propeller, the pitch readings on each propeller blade are taken at six or twelve inch radius intervals and tabulated as described in the following example.

Referring to Fig. 36, the procedure in determining the average pitch of one blade of a propeller of about seven feet in diameter is as follows:

Radius rod bracket, shown in Figs. 10, 11 and 12, is first mounted on the radius rod holders, this has a working radius of three feet and over and is rotated into a convenient, initial position over propeller blade such as on the line A—A. The radius rod bracket is then secured in this position by tightening clamping screws 27 (see Fig. 4) which locks rotating ring 23 to the hub ring 5. The angular position in degrees on retainer ring 25 opposite index indicated is noted for initial pitch readings. Pitch rod 60 is now inserted in pin hole 59 and the distance in inches from where its point 66 touches surface of propeller blade up to the upper edge of topside clamp 61 is read on scale 65 and tabulated under column R1 in distance "A" line of pitch table. The pitch rod is then moved to the next pin hole in radius rod bracket and the distance read and tabulated under R2 in distance line "A".

After distance readings in inches for all pin hole locations along radius rod bracket corresponding to R1, R2, R3, etc., have been taken and tabulated, the clamping screws 27 are loosened and the radius rod bracket rotated through an angle of thirty degrees from its initial position to a final position corresponding to line B—B on Fig. 36. The angular displacement is determined by moving rotating ring 23 thirty degrees from initial position as determined from angular readings on retainer ring 25 at index for initial and final positions.

Distance readings from propeller blade surface to upper edge of topside clamps 61 in inches, for final position along line B—B, are now read for each pin hole location along radius rod bracket corresponding to readings R1, R2, R3, etc., taken for initial position along line A—A. These readings are tabulated in distance line "B" table under proper R$n$ column.

The distance in the "B" line are subtracted from corresponding distance in the "A" line. The resulting differences in inches will represent the pitch of propeller in feet at each radius.

The average pitch of the propeller will be the sum of all the differences divided by the number of differences.

*Example*

| Radius | R1 | R2 | R3 | R4 |
|---|---|---|---|---|
| Distance "A" in inches | 18⅝ | 19 | 18 | 18½ |
| Distance "B" in inches | 8½ | 8¾ | 7¾ | 8 |
| Difference in inches | 10½ | 10¼ | 10¼ | 10½ |
| Pitch in feet | 10' 6'' | 10' 3'' | 10' 3'' | 10' 6'' |

Average difference = $\frac{10½+10¼+10¼+10½}{4}$ = 10⅜''

Average pitch = 10' 4¼''

If the width of the propeller blade is not sufficient to obtain a thirty degree angle between position "A—A" and "B—B" of the radius rod bracket, any smaller angle can be used and differences corrected as follows:

The distance measurements are taken as before and tabulated in same way as for the thirty degree angle between initial and final positions, but the differences in inches between distances "A" and distances "B" are corrected as follows to obtain pitch of propeller:

Pitch in feet = $\frac{\text{(Distance "A"} - \text{Distance "B" inches} \times 30 \text{ degrees}}{\text{Angle between "A—A" and "B—B"}}$ To illustrate, if the angle between the initial and final positions of radius rod bracket was 21 degrees instead of 30 degrees in above example, the average pitch of propeller in feet would be—

Pitch = $10⅜ \times \frac{30}{21}$ = 14.821 feet

To check the pitch of finished propeller before installation on shaft, the pitchometer is set on the machined face of propeller hub with the four hub face bearing surfaces 12 of pitchometer in face to face contact with the face of propeller hub as shown in Fig. 34 which places working plane of pitchometer at right angles to axis to propeller. To center the pitchometer concentrically with propeller axis the hook ends of chucking screws 7 which project into hub bore are moved outward radially by turning adjusting nuts 9 (see Fig. 2) to the right until the projections on outer side of hook ends are in firm contact with inside wall of hub bore. By using the scales 10 on sides of adjusting screws and micrometer scale on said adjusting screws the pitchometer can be accurately centered concentrically with axis of propeller. The radius rod brackets 50 are attached to the radius rod holders and the radius rod 38 and pitch rods 60 set up in place as shown in Figs. 31 and 37. The pitch readings are then taken as hereinbefore described.

In cases where the diameter of propeller hub bore is over eleven inches the gooseneck chucking screws 76 (see Figs. 13 to 16 inclusive) with their chuck blades reversed and adapters 82 attached are used as shown in Figs. 32. It will also be necessary to extend the hub face extension palms sufficiently beyond outside of hub ring 5, as shown in broken lines of Fig. 1 of the drawings to form suitable face to face bearings between face of hub and faces of extension palms.

The set-up of the pitchometer when measuring pitch of a propeller installed on its shaft, while vessel is in dry dock or on building ways, without removing the propeller or propeller nut from its shaft is as follows:

The propeller fairwater nut is removed. If the diameter of propeller nut across its corners is not over seven inches, adjusting screws 7 are used as shown in Fig. 35. The eight hub face bearing surfaces 12 and 19 of hub ring 5 are brought in contact with face of propeller hub and the pitchometer is centered concentrically with axis of propeller shaft by using adjusting screws 7 and taking measurements from shaft to edge of hub ring. Balance of machine is set up and pitch reading taken as earlier described.

In case the propeller nut is over seven inches in diameter across its corners, gooseneck adjusting screws, Fig. 27, are used as shown in Fig. 52. The pitchometer will be centered with shaft center by taking measurements from shaft center to edge of hub ring and adjusting with adjusting nuts. The working plane of pitchometer will be set parallel to face of propeller hub (right angles to propeller axis) by obtaining equal measurements of distance from face of propeller hub to face of pitchometer hub ring.

To check the pitch of propeller molds in foundry, a mandrel is set up in position corresponding to axis of propeller shaft and the pitchometer attached to it, so that its radius arm can swing around over each propeller blade mold.

As the molds are being set in the foundry, the pitch and alignment of each individual blade mold is checked with the pitchometer to assure each part of mold being set in proper pitch, position and alignment.

What I claim is—

1. A universal propeller pitchometer including a chucking device having a set of interchangeable chucking screws, and including a hub ring, bosses on the face of the hub ring and bearings in the bosses for mounting the chucking screws, said chucking screws being of gooseneck formation and means on the chucking device for actuating the chucking screws in a radial direction.

2. A universal propeller pitchometer including a hub ring, a plurality of equally spaced bosses on one face thereof, a plurality of chucking screws, and a plurality of hub face extension palms, the said bosses being provided with bearings to receive the chucking screws and the hub face extension palms.

3. A universal propeller pitchometer including a chucking device means on the rotating ring for receiving a plurality of radius rod holders, a rotating ring mounted on the chucking device, two radius rod holders mounted on the rotating ring and two radius rod brackets and two bracket extension arms carried by the radius rod holders.

4. A universal propeller pitchometer including a chucking device, a rotating ring on the chucking device, radius rod holders and brackets on the rotating ring, and a jointed radius rod slidably supported thereon and rotatable with respect to the chucking device.

5. A universal propeller pitchometer including a chucking device, a rotating ring, two radius rod holders mounted on the rotating ring and two holder extension pieces on the two radius rod holders.

6. A universal propeller pitchometer including a chucking device, a hub ring, a retainer ring, one face of the retainer ring being calibrated in degrees, means for mounting the retainer ring concentrically and rotatably on the hub ring in such manner that any degree of angular displacement between the retainer ring and the hub ring may be obtained and means for securing the retainer ring in any desired position relative to the hub ring.

THOMAS P. FOWLER.